(12) United States Patent
Moore et al.

(10) Patent No.: US 11,030,592 B1
(45) Date of Patent: Jun. 8, 2021

(54) MONEY TRACKING ROBOT SYSTEMS AND METHODS

(71) Applicant: Wells Fargo Bank, N.A., San Francisco, CA (US)

(72) Inventors: Alicia Y. Moore, San Ramon, CA (US); Miranda C. Hill, Seattle, WA (US); Susan Symons, Mooresville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/723,915

(22) Filed: Dec. 20, 2019

Related U.S. Application Data (63) Continuation of application No. 15/864,747, filed on Jan. 8, 2018, now Pat. No. 10,607,198, which is a continuation of application No. 15/388,067, filed on Dec. 22, 2016.

(60) Provisional application No. 62/317,227, filed on Apr. 1, 2016.

(51) Int. Cl.
*G06Q 20/10* (2012.01)
*G07D 11/16* (2019.01)
*G05D 1/02* (2020.01)
*G06Q 40/02* (2012.01)

(52) U.S. Cl.
CPC ....... *G06Q 20/1085* (2013.01); *G05D 1/0212* (2013.01); *G06Q 40/02* (2013.01); *G07D 11/16* (2019.01); *Y10S 901/01* (2013.01)

(58) Field of Classification Search
CPC .... G06Q 20/1085; G06Q 40/02; G07D 11/16; G05D 1/0212; Y10S 901/01
See application file for complete search history.

(56) References Cited

U.S. PATENT DOCUMENTS

| | | | | |
|---|---|---|---|---|
| 3,843,203 A | * | 10/1974 | Golland | G07D 9/00 406/12 |
| 3,949,364 A | | 4/1976 | Clark et al. | |
| 4,470,730 A | | 9/1984 | Wuthrich | |
| 4,638,434 A | * | 1/1987 | Aizaki | G06Q 20/10 705/43 |
| 4,849,664 A | | 7/1989 | Miyazaki et al. | |
| 4,892,345 A | | 1/1990 | Rachael, III | |
| 5,158,274 A | | 10/1992 | Hamada et al. | |
| 5,206,814 A | * | 4/1993 | Cahlander | G07F 11/62 221/88 |
| 5,436,435 A | | 7/1995 | McMillan | |

(Continued)

*Primary Examiner* — Daniel I Walsh
(74) *Attorney, Agent, or Firm* — Foley & Lardner LLP (57) ABSTRACT

A robotic device for transporting physical money including a receiving interface, a counter mechanism, a storage vault, and a control circuit. The receiving interface receives physical money. The counter mechanism is connected to the receiving interface and receives and counts the physical money inserted into the receiving interface. The storage vault stores the physical money counted by the counter mechanism and remains closed when the robotic device is at a first location. The control circuit determines an amount of physical money stored in the storage vault based on the counted physical money, controls a drive system of the robotic device to cause the robotic device to travel from the first location to a second location, and opens the storage vault when the robotic device reaches the second location.

20 Claims, 4 Drawing Sheets

(56) References Cited

U.S. PATENT DOCUMENTS

| | | | | |
|---|---|---|---|---|
| 5,799,288 A * | 8/1998 | Tanaka | ................ | G06Q 20/108 705/43 |
| 6,213,277 B1 | 4/2001 | Blad et al. | | |
| 6,328,149 B1 * | 12/2001 | Blad | ........................ | G07D 5/04 194/217 |
| 6,336,544 B1 * | 1/2002 | Blad | ........................ | G07D 5/04 194/217 |
| 7,602,294 B2 * | 10/2009 | Forrest | ............... | G08B 13/2402 340/539.1 |
| 10,373,462 B2 * | 8/2019 | Oppenheimer | ..... | H04L 25/0226 |
| 10,414,052 B2 | 9/2019 | Deyle et al. | | |
| 10,607,198 B1 * | 3/2020 | Moore | ................... | G07D 11/30 |
| 2002/0063035 A1 * | 5/2002 | Blad | ....................... | G07D 11/30 194/350 |
| 2003/0184163 A1 * | 10/2003 | DeVilbiss | .......... | G06K 19/0701 307/151 |
| 2004/0119593 A1 * | 6/2004 | Kuhns | ............... | G06K 19/0739 340/572.7 |
| 2004/0226802 A1 | 11/2004 | Schneider | | |
| 2005/0077347 A1 | 4/2005 | Uematsu et al. | | |
| 2005/0127590 A1 * | 6/2005 | Ugo | ....................... | G07D 11/14 271/96 |
| 2005/0216126 A1 * | 9/2005 | Koselka | ................ | B25J 9/0003 700/259 |
| 2005/0218292 A1 * | 10/2005 | Kawabe | ............... | G01S 13/74 250/206 |
| 2005/0284358 A1 * | 12/2005 | Laackmann | ....... | G06K 19/0716 116/216 |
| 2006/0238347 A1 * | 10/2006 | Parkinson | ............ | G08B 13/149 340/572.4 |
| 2007/0061041 A1 * | 3/2007 | Zweig | ................... | G05D 1/0261 700/245 |
| 2007/0192910 A1 * | 8/2007 | Vu | ........................ | G05D 1/021 700/245 |
| 2008/0223930 A1 * | 9/2008 | Rolland | ............... | G06Q 10/087 235/385 |
| 2009/0201131 A1 | 8/2009 | Delia et al. | | |
| 2009/0276356 A1 * | 11/2009 | Scipioni | ............... | G06Q 20/204 705/41 |
| 2010/0222925 A1 * | 9/2010 | Anezaki | ............... | G05D 1/0253 700/253 |
| 2011/0106681 A1 * | 5/2011 | Cockerell | ............. | G06Q 10/06 705/35 |
| 2011/0258090 A1 | 10/2011 | Bosch et al. | | |
| 2012/0039529 A1 * | 2/2012 | Rujan | ............. | G06K 19/06037 382/164 |
| 2012/0182392 A1 * | 7/2012 | Kearns | ................... | B25J 19/023 348/46 |
| 2012/0265682 A1 * | 10/2012 | Menon | ................... | G06Q 20/40 705/44 |
| 2012/0282073 A1 | 11/2012 | Fehrenbach | | |
| 2013/0015036 A1 | 1/2013 | Doi et al. | | |
| 2013/0036951 A1 | 2/2013 | Dietz et al. | | |
| 2013/0066799 A1 | 3/2013 | Walters et al. | | |
| 2013/0325244 A1 * | 12/2013 | Wang | ..................... | B25J 9/1689 701/26 |
| 2014/0032396 A1 * | 1/2014 | Sheng | ................... | G07D 11/30 705/39 |
| 2014/0368345 A1 | 12/2014 | Dobbins et al. | | |
| 2015/0134358 A1 * | 5/2015 | Fisher | .................... | G16H 10/60 705/3 |
| 2015/0270776 A1 * | 9/2015 | Mallik | .................. | H02M 3/156 307/31 |
| 2015/0379800 A1 | 12/2015 | Schild et al. | | |
| 2016/0290029 A1 | 10/2016 | Barnes et al. | | |
| 2017/0024838 A1 * | 1/2017 | Kropp | ..................... | G06Q 50/28 |
| 2017/0225321 A1 * | 8/2017 | Deyle | ..................... | B25J 9/1679 |
| 2018/0247480 A1 | 8/2018 | Numata et al. | | |
| 2019/0197813 A1 | 6/2019 | Nagai et al. | | |
| 2019/0302775 A1 * | 10/2019 | Palan | .................... | B62B 5/0003 |
| 2020/0050206 A1 * | 2/2020 | Deyle | ..................... | G01S 13/74 |
| 2020/0130182 A1 * | 4/2020 | Kushner | ............... | G07F 19/203 |

\* cited by examiner

MONEY TRACKING ROBOT SYSTEMS AND METHODS

CROSS-REFERENCE TO RELATED APPLICATIONS

This application is a continuation of U.S. patent application Ser. No. 15/864,747, filed Jan. 8, 2018, which is a continuation of U.S. patent application Ser. No. 15/388,067, filed Dec. 22, 2016, which claims priority to U.S. Provisional Patent Application No. 62/317,227, filed Apr. 1, 2016, all of which are incorporated herein by reference in their entireties.

BACKGROUND

Financial institutions typically employ surveillance systems to monitor and safeguard assets, employees, and customers of the financial institution. Surveillance systems provide many benefits to financial institution, including enabling the financial institution to positively identify employees and customers, to prevent criminal activity from occurring within or near the financial institution, or to recover from and potentially help apprehend individuals responsible for any criminal activity that occurs. To provide adequate surveillance, financial institutions typically position video cameras to capture images in areas that customers or employees can access, such as a lobby, a teller transaction area, a safety deposit box room, a vault, a money counting room, or other area where currency or valuables may be stored or transported through.

SUMMARY

One embodiment relates to a robotic device for transporting physical money. The robotic device includes a receiving interface, a counter mechanism, a storage vault, and a control circuit. The receiving interface is configured to receive physical money. The counter mechanism is connected to the receiving interface to receive the physical money, and the counter mechanism is configured to count the physical money inserted into the receiving interface. The storage vault is configured to store the physical money counted by the counter mechanism and configured to remain in a closed configuration when the robotic device is at a first location. The control circuit is configured to determine an amount of physical money stored in the storage vault based on the counted physical money. The control circuit is further configured to control a drive system of the robotic device to cause the robotic device to travel from the first location to a second location. The control circuit is further configured to open the storage vault when the robotic device reaches the second location.

Another embodiment relates to a financial institution computing system. The financial institution computing system includes a network circuit, a transaction database, and a money tracking circuit. The network circuit enables the financial institution computing system to exchange information over a network. The transaction database stores transaction information for a plurality of transactions made at a financial institution. The money tracking circuit is configured to receive, over the network via the network circuit, a money transfer request from a teller transaction device specifying an amount of physical money to be transferred from a first location to a second location. The money tracking circuit is further configured to receive, over the network via the network circuit, money tracking data from a robotic device configured to monitor and track the physical money within the financial institution while the physical money is transferred from the first location to the second location. The money tracking circuit is further configured to store the money tracking data in the transaction database. The money tracking circuit is further configured to transmit, over the network via the network circuit, a confirmation to the teller transaction device.

Another embodiment relates to a method of transferring money. The method includes receiving, by a receiving interface of a robotic device, physical money. The method further includes counting, by a counter mechanism of the robotic device, the physical money inserted into the receiving interface, wherein the counter mechanism is connected to the receiving interface. The method further includes storing, by a storage vault of the robotic device, the physical money counted by the counter mechanism. The storage vault is configured to remain closed when the robotic device is at a first location. The method further includes determining, by a control circuit of the robotic device, an amount of physical money stored in the storage vault based on the counted physical money. The method further includes controlling, by the control circuit of the robotic device, a drive system of the robotic device to cause the robotic device to travel from the first location to a second location. The method further includes opening, by the control circuit, the storage vault when the robotic device reaches the second location.

Another embodiment relates to a method of monitoring physical money in a financial institution. The method includes receiving, by a money tracking circuit over the network via a network circuit, a money transfer request from a teller transaction device specifying an amount of physical money to be transferred from a first location to a second location. The method further includes receiving, by the money tracking circuit over the network via the network circuit, money tracking data from a robotic device configured to monitor and track the physical money within the financial institution while the physical money is transferred from the first location to the second location. The method further includes storing, by the money tracking circuit, the money tracking data in a transaction database. The method further includes transmitting, by the money tracking circuit via the network circuit, a confirmation to the teller transaction device.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, the embodiments of systems and methods discussed herein may be relevant to any of a variety of circumstances where tracking devices may be used to track or monitor specific items, such as currency or other valuables.

Embodiments of money tracking robot systems and methods are discussed below. In one embodiment, a robotic device for transporting physical money is configured to receive physical money at a first location. For example, the robotic device may receive money from a teller via a teller transaction device at a bank branch of a financial institution. The teller transaction device may be located at a first area where a teller can conduct transactions and interact with bank customers. The teller may remove physical money from a cash drawer of the teller transaction device and deposit the money in the robotic device for any number of reasons (e.g., due to the teller drawer containing an amount of money exceeding a recommended amount, the teller cashing out at the end of a shift, the teller needing different denominations of currency). A counter mechanism onboard the robotic device receives and counts the physical money, and the physical money is stored in a storage vault of the robotic device. A control circuit of the robotic device determines an amount of physical money stored in the storage vault based on the counted physical money, causes the drive system of the robotic device to cause the robotic device to travel from the first location to a second location, and opens the storage vault when the robotic device reaches a specific location. For example, the storage vault may be configured to open only in certain locations within the financial institution (e.g., inside a bank vault, near a teller transaction device, only in view of a security camera).

Another embodiment of the money tracking robot systems and methods includes a financial institution computing system that includes a money tracking circuit that receives a money transfer request from a teller transaction device specifying an amount of physical money to be transferred from a first location to a second location. The money tracking circuit also receives money tracking data from a robotic device configured to monitor and track the physical money within the financial institution while the physical money is transferred from the first location to the second location. The money tracking circuit further stores the money tracking data in a transaction database of the financial institution computing system and then transmits a confirmation to the teller transaction device. For example, the confirmation may serve to notify the teller and the teller transaction device that the transfer of physical money was successful.

Accordingly, the money tracking robot systems and methods discussed herein provide enhanced security measuring for monitoring and tracking physical money being transferred from one location to another within a financial institution. For example, instead of requiring multiple parties to transfer large sums of cash from one location to another location, the robotic device can either transport the physical monies itself or monitor an individual transporting the money, thereby eliminating the need for security cameras covering every area of the financial institution or for multiple individuals to be present when transporting physical money within the financial institution. For example, the robotic device is able to follow an individual transporting physical money through a financial institution such that if the individual were to locate a blind spot between wall-mounted security cameras, the sensing device of the robotic device would continue to monitor and record the actions of the individual.

The embodiments and implementations of the money tracking robot systems and methods disclosed herein improve current financial institution surveillance and money tracking systems by ensuring that physical money is securely transferred between locations within a financial institution or that an individual transporting the physical money is continuously monitored throughout the transfer. These systems, methods, and computer implementations improve the security of physical money being transferred within a financial institution by ensuring that the physical money reaches its intended destination when being transferred. As such, the systems, methods, and computer implementations disclosed herein improve the functioning of surveillance and monitoring systems of a financial institutions by reducing the risk of theft during physical money transfers using novel and non-obvious improvements over current systems.

Figure 1:
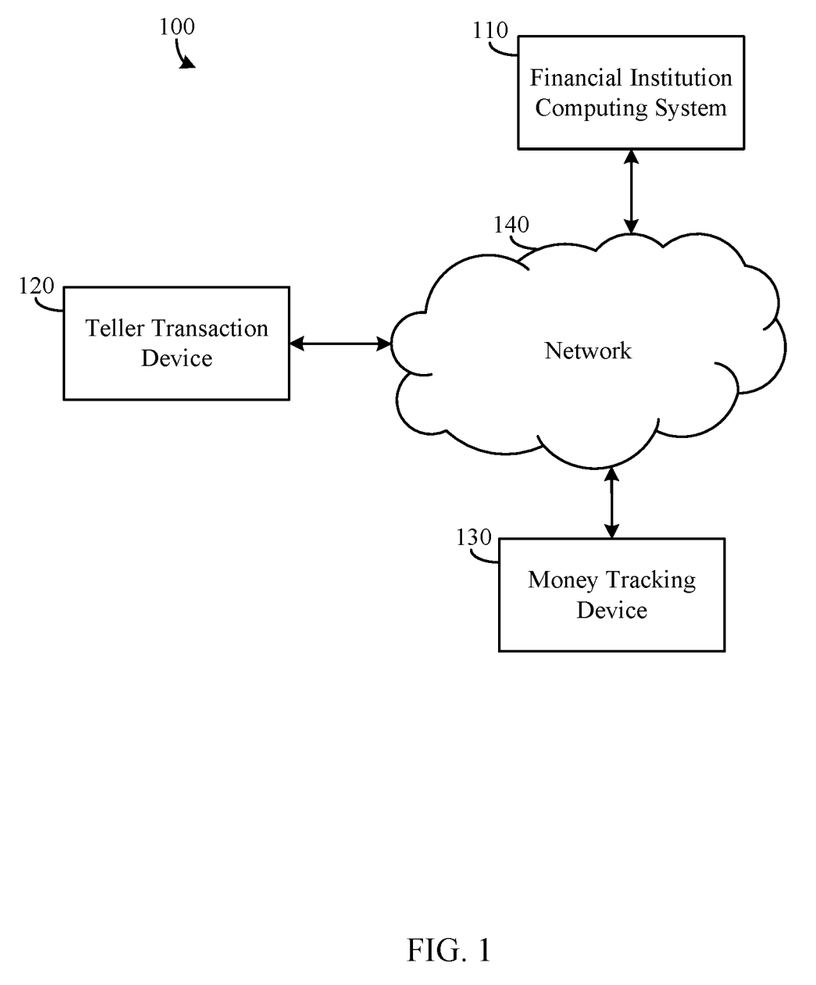
FIG. 1 is a block diagram illustrating a money tracking system, according to an example embodiment.

Referring to FIG. 1, a block diagram illustrating a money tracking system 100 is shown according to an example embodiment. The money tracking system 100 includes a financial institution computing system 110, a teller transaction device 120, and a money tracking device 130. Various components of the system 100 may be configured to communicate with each other over a network 140. The network 140 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 140 includes the internet.

The financial institution computing system 110 is a computing system at a financial institution that is capable of maintaining customer accounts (e.g., payment card accounts, savings accounts, checking accounts) and databases of customer information and transaction information. The financial institution may include commercial or private banks, credit unions, investment brokerages, or the like. In response to a received transaction request (e.g., from a teller transaction device 120), the financial institution computing system 110 may be configured to authenticate transaction information and authorize the transaction request (e.g., determining whether the identified financial account contains sufficient funds, and debiting or crediting the identified financial account as part of a teller transaction). The financial institution computing system 110 may be configured to track amounts of currency held by the financial institution, including physical money stored in a teller transaction device 120 and physical money stored in a money tracking device 130, a vault, and physical money transferred from one location to another location within the financial institution (e.g., via money tracking device 130, an employee of the financial institution).

The teller transaction device 120 may include any type of computing device used to facilitate management of currency within a financial institution associated with the financial institution computing system 110. In some embodiments, a teller uses the teller transaction device 120 to assist customers of the financial institution with in-person transactions. For example, customers of the financial institution may interact with a teller of the teller transaction device 120 to deposit and withdraw funds in a variety of forms (e.g., physical money, checks) as well as to conduct other financial transactions. The teller transaction device 120 may include a cash drawer or other compartment for temporarily storing physical money received from customers for deposit or for customers to withdraw.

The money tracking device 130 may include any type of device used to track the status and location of physical money within the financial institution. The money tracking device 130 may be a robotic device configured to transport physical money from a first location to a second location within the financial institution. The robotic device may receive money from a teller via teller transaction device 120 at a bank branch of a financial institution. The teller transaction device 120 may be located at a first area where a teller can conduct transactions and interact with bank customers. The money tracking device 130 may receive physical money from a teller (e.g., from a cash drawer of teller transaction device 120). The money tracking device 130 counts the money received from the teller and stores the physical money in secure area within the money tracking device 130. The money tracking device 130 then travels from the first location to a second location within the financial institution (e.g., a bank vault). In one embodiment, the money tracking device 130 is an autonomous robotic device configured to track physical money as the money is carried or otherwise transported within the financial institution by an individual. For example, the autonomous robotic device may be configured to track physical money and an individual carrying the money in response to receiving a command to track the physical money and the individual from the financial institution computing system 110 or from the teller transaction device 120. In some embodiments, the autonomous robotic device is configured to track physical money and an individual carrying the money in response to sensing that physical money is being transported from one location to another location or in response to determining that physical money is being carried beyond a perimeter of a first location. For example, the autonomous robotic device may be configured to detect physical money being carried by an individual and automatically follow the physical money and the individual carrying the physical money if the individual leaves a specific area or room with the physical money.

Figure 2:
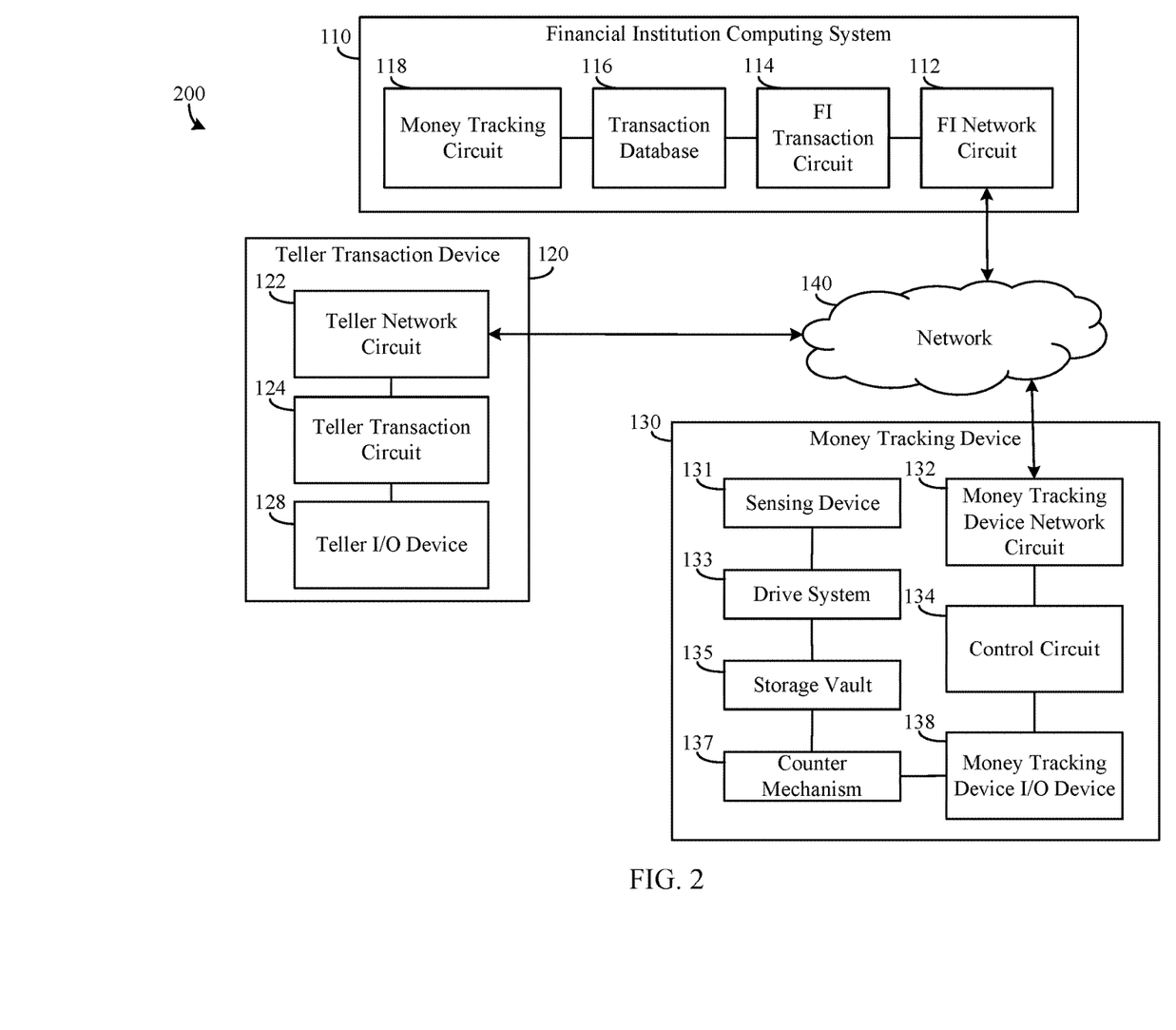
FIG. 2 is a block diagram illustrating an example embodiment of the money tracking system shown in FIG. 1.

Referring now to FIG. 2, a money tracking system 200 is shown as a more detailed embodiment of the money tracking system 100. The system 200 includes example embodiments of the financial institution computing system 110, teller transaction device 120, and money tracking device 130 of FIG. 1.

In the money tracking system 200, the financial institution computing system 110 includes a financial institution (FI) network circuit 112, an FI transaction circuit 114, a transaction database 116, and a money tracking circuit 118. The FI network circuit 112 is configured to enable the financial institution computing system 110 to exchange data over the network 140.

The FI transaction circuit 114 is configured to facilitate transactions involving the teller transaction device 120. The FI transaction circuit 114 may receive a transaction request from the teller transaction device 120 over the network 140 via the FI network circuit 112. In one embodiment, the FI transaction circuit 114 authenticates a customer using information included in the transaction request. In one embodiment, the FI transaction circuit 114 looks up the information in a customer database and confirms whether the information is associated with an authorized user of a financial account. If known information matches the information in the transaction request, the FI transaction circuit 114 may authenticate the transaction request. In some embodiments, the FI transaction circuit 114 may be configured to prompt the teller via the teller I/O device 128 to request additional authentication information from the customer (e.g., a PIN, answers to one or more security questions, a photo identification card, etc.).

The transaction database 116 is configured to store transaction information for a plurality of transactions made at a financial institution. In some embodiments, the transaction database 116 is configured to hold, store, categorize, and otherwise serve as a repository for transaction information. The transaction database 116 is configured to selectively provide access to information relating to one or more transactions that occur at the financial institution (e.g., via teller transaction device 120). The transaction database 116 is communicably and operatively coupled to the FI transaction circuit 114 and the money tracking circuit 118 to provide access to such information, such that the FI transaction circuit 114 and the money tracking circuit 118 may use the information to determine a status and location of physical money in the financial institution.

The money tracking circuit 118 is configured to receive information regarding the transfer of physical money within the financial institution and to track the status and location of the physical money. The money tracking circuit 118 is configured to receive, over the network 140 via the network circuit 112, a money transfer request from a teller transaction device 120 specifying an amount of physical money to be transferred. The money transfer request may specify a first location from which the physical money is to be received and a second location where the physical money is to be dropped off or deposited. For example, the first location may be at or proximate to teller transaction device 120 and the second location may be a bank vault. The money tracking circuit 118 is configured to receive, over the network 140 via the network circuit 112, money tracking data from a robotic device (e.g., money tracking device 130) configured to monitor and track the physical money within the financial institution while the physical money is transferred from the first location to the second location.

The money tracking circuit 118 is configured to store the money tracking data in the transaction database 116. The money tracking data may be indicative of a status and location of the physical money within the financial institution. The status of the physical money may indicate if physical money is currently being transferred or scheduled to be transferred, how much physical money is to be transferred, where the physical money is to be transferred from, where the physical money is to be transferred to, etc. The money tracking circuit 118 may be configured to reconcile the amount of physical money requested to be transferred with the actual amount of physical money received and counted by the robotic device and dropped off or deposited at the second location. The money tracking circuit 118 is configured to transmit, over the network 140 via the network circuit 112, a confirmation to the teller transaction device 120. The confirmation may notify the teller and the teller transaction device 120 that the transfer of physical money was successful. For example, the confirmation may indicate how much money was transferred from the first location to the second location and whether any discrepancies were determined to exist between the amount of money removed from a drawer of the teller transaction device 120 and the amount of money successfully deposited in the bank vault.

In the money tracking system 200, the money tracking device 130 includes a sensing device 131, a money tracking device network circuit 132, a drive system 133, a control circuit 134, a storage vault 135, a counter mechanism 137, and a money tracking device input/output (I/O) device 138. The money tracking device network circuit 132 enables the money tracking device 130 to exchange data over the network 140. In some embodiments, the money tracking device 130 is a robotic device. The money tracking device 130 may be mobile or non-mobile.

The money tracking device 130 may be an autonomous robotic device. The money tracking device 130 is configured to track physical money as the money is transported within the financial institution by an individual. In some embodiments, the money tracking device 130 is configured to security store the physical money onboard the money tracking device 130 within storage vault 135. For example, the autonomous robotic device may be configured to track at least one of the physical money and an individual carrying the money in response to receiving a command to track at least one of the physical money and the individual from the financial institution computing system 110 or from the teller transaction device 120. In some embodiments, the autonomous robotic device is configured to track at least one of physical money and an individual carrying the money in response to sensing that physical money is being transported from one location to another location or in response to determining that physical money is being carried beyond a perimeter of a first location. For example, the autonomous robotic device may be configured to detect physical money being carried by an individual and automatically follow at least one of the physical money and the individual carrying the physical money if the individual leaves a specific area or room with the physical money.

An input aspect of the money tracking device I/O device 138 allows an individual operating the money tracking device 130 to provide information to the money tracking device 130, and may include, for example, a mechanical keyboard, a touchscreen, a microphone, a camera, a fingerprint scanner, any user input device engageable to the money tracking device 130 via a USB, serial cable, Ethernet cable, and so on. An output aspect of the money tracking device I/O device 138 allows an individual associated with the money tracking device 130 or in proximity to the money tracking device 130 to receive information from the money tracking device 130, and may include, for example, a digital display, a speaker, illuminating icons, LEDs, and so on. Further, the money tracking device I/O device 138 may be configured to include assemblies that serve both input and output functions, allowing the financial institution computing system 110 and the teller transaction device 120 to exchange information with the money tracking device 130. Such assemblies include, for example, radio frequency transceivers (e.g., RF or NFC-based transceivers) and other short-range wireless transceivers (e.g., Bluetooth, laser-based data transmitters, etc.). In some embodiments, the money tracking device I/O device 138 may be a receiving interface configured to receive physical money.

In some embodiments, the sensing device 131 is configured to monitor an area surrounding the money tracking device 130. In some embodiments, the sensing device 131 is configured to monitor and track at least one of physical money and an individual transporting the physical money and any other individual in proximity to the physical money. The sensing device 131 may include any type of equipment capable of acquiring information regarding the physical money and individuals with access to the physical money, such as location information, movement information, biometric information, a physiological characteristic of an individual, and so on. The sensing device 131 may include a camera (e.g., photographic camera, video camera, thermal camera), a radar, a microphone, proximity sensors, GPS sensors, a LIDAR device, a near-field communication device, among other sensing devices. In some embodiments, the sensing device 131 includes multiple sensing devices. The sensing device 131 is configured to provide money tracking data to the control circuit 134 and to the financial institution computing system 110. The sensing device 131 is configured to generate money tracking data regarding the physical money and an individual when the money is transported by the individual from a first location to a second location. In some embodiments, the physical money or wrappers that the physical money is wrapped in are tagged with wireless tags (e.g., RFID), and the money tracking device 130 is configured to stay within proximity of the wrappers as the physical money moves about the financial institution. For example, in some embodiments, the money tracking device 130 could be configured to stay within six feet of the wireless tags incorporated into the wrappers of the physical money.

The drive system 133 of the money tracking device 130 is configured to enable the money tracking device 130 to autonomously move about an area, such as a financial institution. The drive system 133 is constructed to include various parts or devices for enabling the money tracking device 130 to move, such as wheels, tracks, treads, propellers, rotors, and legs. The drive system 133 is configured to enable the money tracking device 130 to travel from at least a first location to a second location. For example, in one embodiment, the money tracking device 130 includes prime movers (e.g., one or more electric motors) coupled between the drive system 133 and wheels to provide a motive force that causes the money tracking device 130 to move.

In some embodiments, the drive system 133 further includes a navigation system. The navigation system can include any number and type of navigation components for enabling the money tracking device 130 to navigate an area in which the money tracking device 130 is intended to operate. In some embodiments, the navigation system of the drive system 133 is configured to receive inputs from at least one sensor. The inputs may be indicative of a position of the money tracking device 130. In some embodiments, the navigation system is configured to determine a layout of the area that the money tracking device 130 operates in. For example, the navigation system of the money tracking device 130 may be configured to determine the locations of objects about the financial institution, including locations of the teller transaction device 120, a wall, an individual (e.g., a bank employee), and other objects (e.g., a chair, a trash bin, a pen or pencil lying on the floor). The navigation system is configured to enable the money tracking device 130 to navigate about an area of the financial institution while avoiding such objects. For example, the navigation system may receive inputs from navigation sensors regarding the position of the money tracking device 130 with respect to an object, and control the drive system 133 to navigate around the objects based on the inputs received from the navigation sensors. In some embodiments, the navigation system tracks the position of the money tracking device 130 within the financial institution and provides commands to the drive system 133. The drive system 133 controls movement of the money tracking device 130 based on commands received from the navigation system and/or the control circuit 134. In some embodiments, a layout of the area that the money tracking device 130 operates in is provided to the navigation system 133. For example, in some embodiments, the control circuit 134 can be programed with a layout of a bank that the money tracking device 130 is intended to operate in.

The control circuit 134 is configured to determine an amount of physical money stored in the storage vault based 135 on the counted physical money as counted by the counter mechanism 137. The control circuit 134 may be configured to transmit the determined amount of physical money stored in the storage vault 135 to the money tracking circuit 118 over the network 140 via the money tracking device network circuit 132 so that the money tracking circuit 118 can reconcile the amount of physical money requested to be transferred with the actual amount of physical money received and counted by the robotic device and transferred to the second location The control circuit 134 is configured to control the various components of the money tracking device 130, including the sensing device 131, the money tracking device network circuit 132, the drive system 133, the storage vault 135, the counter mechanism 137, and the money tracking device I/O device 138. The control circuit 134 is configured to control drive system 133 to cause the money tracking device 130 to travel from a first location to a second location. In some embodiments, the control circuit 134 controls the drive system 133 to cause the money tracking device 130 to travel from the first location to the second location in response to the determined amount of physical money stored in the storage vault 135 exceeding a threshold. In some embodiments, the control circuit 134 controls the drive system 133 to cause the money tracking device 130 to travel from the first location to the second location in response to receiving a command to transport the physical money. In some embodiments, the control circuit 134 is configured to control the drive system 133 to cause the money tracking device 130 to travel from the first location to the second location in response to the receiving interface not receiving money for an amount of time exceeding a threshold.

The control circuit 134 is configured to variously secure and open the storage vault 135. In some embodiments, the control circuit 134 opens the storage vault when the robotic device reaches the second location (e.g., a bank vault). In some embodiments, the control circuit 134 secures the storage vault 135 by keeping the storage vault 135 closed and inaccessible to individuals in areas of the financial institution that are not in the range or field of view of other security systems and devices (e.g., wall-mounted security cameras). For example, the control circuit 134 may enable the storage vault 135 to be opened at a teller transaction device 120 so long as the teller transaction device 120 is in the field of view of a security camera, and to lock the storage vault 135 so that the storage vault 135 cannot be opened once the money tracking device 130 exits a perimeter of an area proximate the teller transaction device 120 until the money tracking device 130 enters a vault of the financial institution.

In some embodiments, the control circuit 134 is configured to transmit, over the network 140 via the money tracking device network circuit 132, a confirmation to the financial institution computing system 110. In some embodiments, the confirmation includes details relating to the transfer of money, including an amount of money being transferred, a bank employee that authorized the transfer, and the location for the money to be transferred. In some embodiments, the confirmation indicates that the physical money has been successfully transported to the location for the money to be transferred. The money tracking device 130 is configured to transmit money tracking data to at least one of the financial institution computing system 110 and the teller transaction device 120. In some embodiments, the money tracking device 130 generates money tracking data and transmits the money tracking data to at least one of the financial institution computing system 110 and the teller transaction device 120 over the network 140 via the money tracking device network circuit 132 in real-time.

The storage vault 135 is configured to securely store the physical money stored by the money tracking device 130. The storage vault 135 receives the physical money after the physical money has been counted by the counter mechanism 137. The storage vault 135 is configured to remain in a closed and locked configuration or an accessible configuration. For example, the storage vault 135 may be configured to be opened at a teller transaction device 120 so long as the teller transaction device 120 is in the field of view of a security camera, and to be in a locked configuration so that the storage vault 135 cannot be opened once the money tracking device 130 exits a perimeter of an area proximate the teller transaction device 120 until the money tracking device 130 enters a vault of the financial institution. The money tracking device 130 may be configured to function as a store or a vault that tellers can sell physical money to and withdraw physical money from. The money tracking device 135 may further include an authentication mechanism for authenticating an individual before the individual is able to withdraw money from the storage vault 135. For example, before an individual is able to withdraw money from the storage vault 135, the individual may be required to provide authentication information (e.g., via a keypad or other input device of the money tracking device I/O device 138) to authenticate the transaction (e.g., the dollar amount of the transaction, an information input matching information stored in the transaction database 116 of the financial institution computing system 110, and so on).

The counter mechanism 137 is configured to receive the physical money input into the receiving interface of the money tracking device 130 and to count the physical money. The counter mechanism 137 may include a variety of sensors and other components to accurately count the currency. In one embodiment, the counter mechanism 137 is positioned downstream of the receiving interface and before the storage vault 135. In some embodiments, the counter mechanism 137 is positioned at any location within the body of the money tracking device 130.

In the money tracking system 200, the teller transaction device 120 includes a teller network circuit 122, a teller transaction circuit 124, and a teller input/output (I/O) device 128. The teller network circuit 122 enables the teller transaction device 120 to exchange data over the network 140. Similar to the money tracking device I/O device 138, the teller I/O device 128 includes hardware and associated logics configured to enable the teller transaction device 120 to exchange information with a customer (e.g., a bank customer), the money tracking device 130 (e.g., via corresponding hardware and logics at the money tracking device I/O device 138), and an attendant (e.g., a bank teller), if any. The teller I/O device 128 may include any of the input, output, and input/output functionalities discussed with respect to the money tracking device I/O device 138, above.

In some embodiments, the teller I/O device 128 includes a teller drawer or compartment for storing physical money for use in banking transactions. The drawer may include any type of storage device that may be used by a teller, or other financial institution personnel, to store and access physical money. The drawer may include any sliding-type teller drawer used to store currency, which can be locked and unlocked by the teller during a transaction. The drawer may also include vault-type storage, which may be used to store higher denominations of currency which require a more secure type of storage.

The teller transaction circuit 124 is configured to facilitate transactions involving the teller transaction device 120. The teller transaction circuit 124 is configured to communicate with the FI transaction circuit 114 to send and receive data regarding a transaction. For example, the teller transaction circuit 124 may transmit transaction request over the network 140 via the teller network circuit 122 to the FI transaction circuit 114. The FI transaction circuit 114 may in turn authorize a transaction in response to the transaction request. In some embodiments, the teller transaction circuit 124 is configured to prompt the teller via the teller I/O device 128 to request additional authentication information from the customer (e.g., a PIN, answers to one or more security questions, a photo identification card, etc.).

Figure 3:
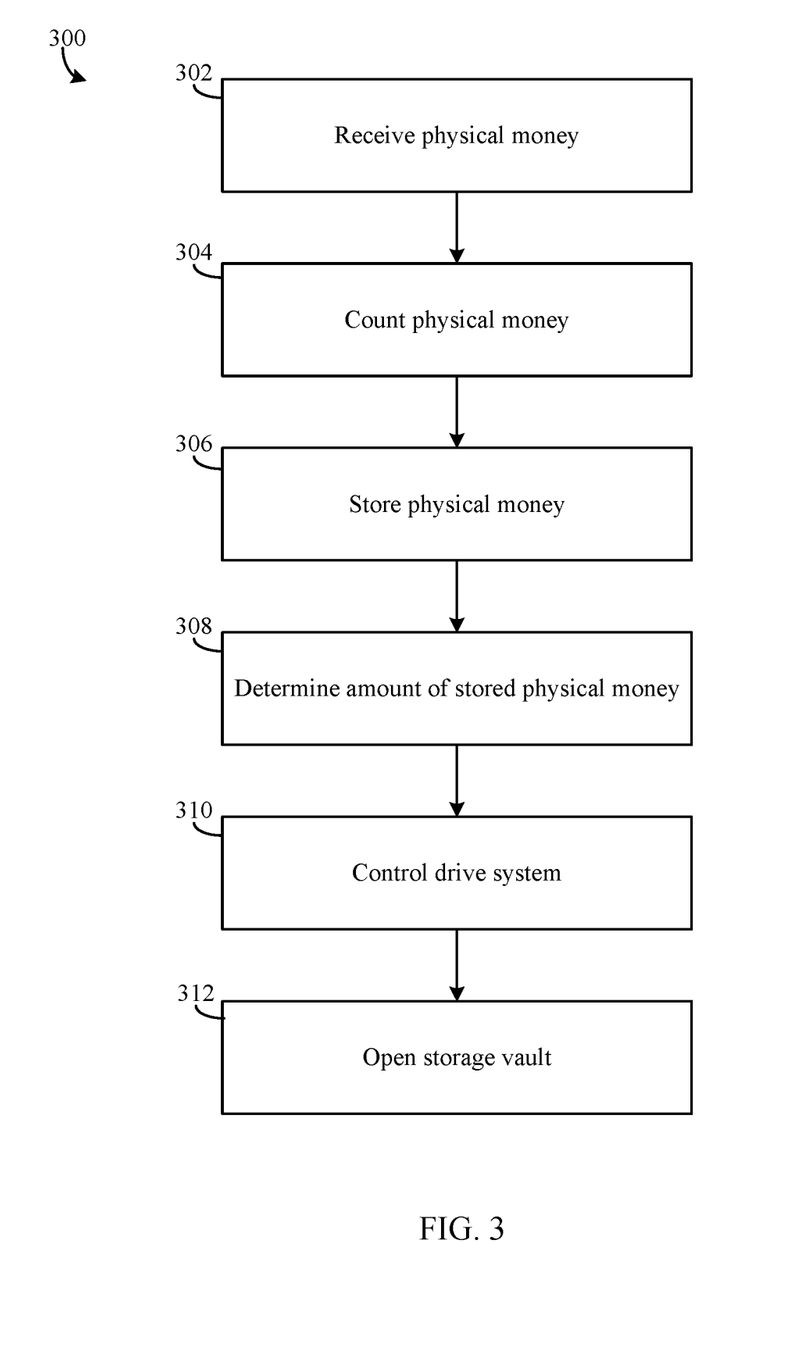
FIG. 3 is a flowchart of a method of transferring money, according to an example embodiment.

Referring now to FIG. 3, a flowchart of a method 300 of transferring money is shown according to an example embodiment. The method 300 may be performed by a robotic device such as money tracking device 130. Some steps of the method 300 may be performed by processing and storage hardware on the robotic device, as executed by one or more logics comprising one or more software applications configured to perform the functions described below.

At step 302, physical money is received. Physical money is received by a receiving interface of a robotic device (e.g., money tracking device 130). The physical money may be received from a teller associated with a teller transaction device 120. The teller may input physical money into the robotic device based on a variety of factors. For example, the teller may deposit physical money with the robotic device due to the teller drawer containing an amount of money exceeding a recommended amount, the teller cashing out at the end of a shift, or the teller needing different denominations of currency. In some embodiments, the robotic device functions as a store or a vault that tellers can sell physical money to instead of selling the physical money to a main vault.

At step 304, physical money is counted. A counting mechanism (e.g., counter mechanism 137) of the robotic device counts the physical money inserted into the receiving interface, which is structurally connected to the counting mechanism. It will be appreciated that a variety of sensors may be used to count the physical money provided to the robotic device to ensure that the money counting mechanism accurately counts the money.

At step 306, physical money is stored. The physical money may be stored by the robotic device. For example, the physical money may be stored in a secure storage area, such as an onboard vault (e.g., storage vault 135). The storage area may be configured to remain closed and locked when the robotic device is at a first location such that the interior of the storage area is inaccessible to an individual (e.g., bank customers, the teller, other bank employees). The storage area may be configurable to open at a second location, such as at a bank vault where the physical money is to be transferred, or when additional bank employees are present.

At step 308, an amount of stored physical money is determined. The amount of physical money stored in the storage vault is determined (e.g., by the control circuit 134 of the robotic device). The determined amount of physical money stored in the storage vault is based on the counted physical money as counted by the counting mechanism (e.g., the counter mechanism 137). The determined amount of stored physical money may be transmitted (e.g., by the control circuit 134) to a financial institution computing system (e.g., the financial institution computing system 110) for recordkeeping purposes and analysis.

At step 310, a drive system of the robotic device is controlled. The drive system of the robotic device is controlled (e.g., by the control circuit 134) to drive the robotic device. For example, the robotic device can be controlled to travel from a first location to a second location. For example, after receiving money from a teller proximate to a teller transaction device, the drive system of the robotic device can be controlled to travel from the area proximate the teller transaction device to a bank vault. In some embodiments, the drive system is controlled to cause the robotic device to follow at least one of money being carried by an individual and an individual carrying the money.

At step 312, the storage vault of the robotic device is opened. The storage vault of the robotic device is opened such that the physical money stored inside can be accessed by an individual and removed from the robotic device. For example, a controller (e.g., the control circuit 134) may be configured to cause the storage vault to open once the robotic device enters a bank storage vault, a location specified for physical money stored onboard the robotic device to be transferred to, or at a time when a certain number of or a specific bank employee is present. In some embodiments, a confirmation is transmitted (e.g., by the control circuit 134 over a network 140 via a network circuit 132) to a financial institution computing system that indicates that the physical money has been transported to the second location.

Figure 4:
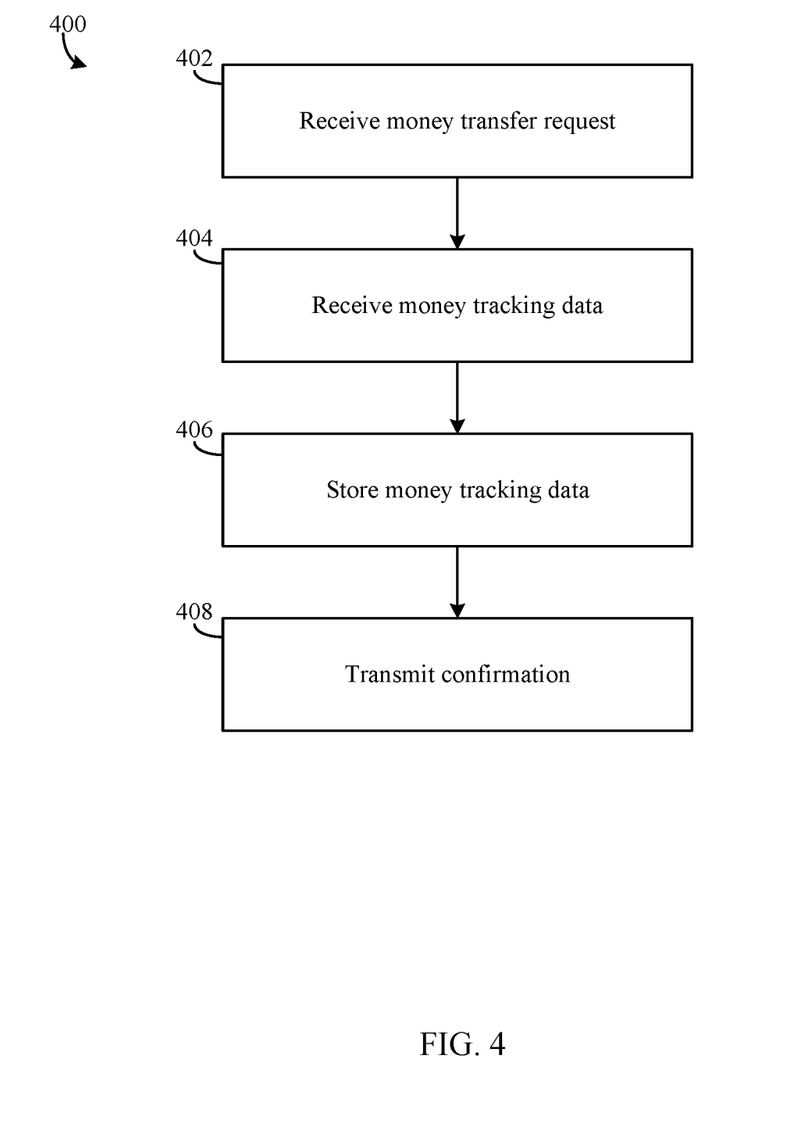
FIG. 4 is a flowchart of a method of monitoring physical money in a financial institution, according to an example embodiment.

Referring now to FIG. 4, a flowchart of a method 400 of monitoring physical money in a financial institution is shown according to an example embodiment. The method 400 may be performed by processing and storage hardware on a financial institution computing system (e.g., the financial institution computing system 110), as executed by one or more logics comprising one or more software applications configured to perform the functions described below.

At step 402, a money transfer request is received. A money tracking circuit (e.g., the money tracking circuit 118) of a financial institution (e.g., the financial institution computing system 110) may receive a request indicating an amount of money to be transferred from a first location within a financial institution to a second location within the financial institution. The request may be received over a network (e.g., the network 140) via a network circuit (e.g., the FI network circuit 112). The request may originate with a teller transaction device (e.g., the teller transaction device 120) located within the financial institution.

At step 404, money tracking data is received. A money tracking circuit (e.g., the money tracking circuit 118) of a financial institution computing system (e.g., the financial institution computing system 110) receives money tracking data over a network (e.g., the network 140) via a network circuit (e.g., the FI network circuit 112). The money tracking device, money tracking data from a robotic device configured to monitor and track the physical money within the financial institution while the physical money is transferred from the first location to the second location.

At step 406, money tracking data is stored. Money tracking data is stored by a money tracking circuit (e.g., the money tracking circuit 118) of a financial institution (e.g. the financial institution computing system 110) in a database (e.g., the transaction database 116). The money tracking data can be stored for purposes of recordkeeping and analysis.

At step 408, a confirmation is transmitted. A confirmation is transmitted by a money tracking circuit (e.g., the money tracking circuit 118) over a network (e.g., the network 140) via a network circuit (e.g., the FI network circuit 112) to a teller transaction device (e.g., the teller transaction device 120). The confirmation may be displayed on an display screen of the teller transaction device (e.g., the teller I/O device 128). The confirmation may include details relating to the transfer of money, including an amount of money being transferred, a bank employee that authorized the transfer, and the location for the money to be transferred. In some embodiments, the confirmation indicates that the physical money has been successfully transported to the correct transfer location.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A robotic device for tracking physical money within a building, comprising:
    a sensing system configured to:
        track a location of a tag attached to physical money;
        detect obstacles along a route from a first area of the building to a second area of the building, wherein the first area and the second area are separated from each other; and
        record actions of an individual while the individual carries the physical money from the first area to the second area;
    a drive system controllable to move the robotic device within the building;
    a control circuit configured to control the drive system based on data from the sensing system such that the robotic device follows the physical money and the individual from the first area to the second area while avoiding the obstacles and maintaining less than a predetermined distance between the robotic device and the physical money; and
    a communications circuit configured to:
    identify a planned destination for the physical money;
    initiate transmission of a confirmation message over a network in response to a determination that the physical money reaches the second area and that the second area matches the planned destination, the confirmation message indicating successful transfer of the physical money to the planned destination.

2. The robotic device of claim 1, wherein the sensing system comprises one or more of a photographic camera, a video camera, or an infrared camera.

3. The robotic device of claim 1, wherein the sensing system comprises one or more of a radio-frequency transceiver, a Bluetooth transceiver, or a laser-based data transceiver.

4. The robotic device of claim 1, wherein the drive system comprises one or more propellers.

5. The robotic device of claim 1, wherein the drive system comprises one or more of a wheel, a track, a tread, or a leg.

6. The robotic device of claim 1, wherein the communications circuit is configured to transmit the recorded actions of the individual over the network.

7. The robotic device of claim 1, wherein the control circuit is configured to initiate control of the drive system to follow the physical money in response to a determination that the physical money moved beyond a perimeter of the first location.

8. One or more non-transitory computer-readable media storing instructions that, when executed by one or more processors, cause the one or more processors to perform operations comprising:
    determining, based on first data from a sensing system, a location of a tag attached to physical money;
    identifying a planned destination for the physical money;
    locating, based on second data from the sensing system, obstacles along a route from a first area of a building to a second area of the building, wherein the first area and the second area are separated from each other;
    controlling a drive system of a robotic device based on the first data and the second data such that the robotic device follows the physical money from the first area to the second area while avoiding the obstacles and maintaining less than a predetermined distance between the robotic device and the physical money; and
    initiating transmission of a confirmation message over a network in response to a combination of (1) arrival of the physical money at the second area and (2) a determination that the second area matches the planned destination for the physical money, the confirmation message indicating successful transfer of the physical money to the planned destination.

9. The computer-readable media of claim 8, wherein the first data comprises an output of a radio-frequency transceiver, a Bluetooth transceiver, or a laser-based data transceiver.

10. The computer-readable media of claim 8, wherein the second data comprises image or video data from a camera of the sensing system.

11. The computer-readable media of claim 8, wherein controlling the drive system comprises controlling operation of a propeller.

12. The computer-readable media of claim 8, wherein controlling the drive system comprises controlling operation of a wheel, a track, a tread, or a leg.

13. The computer-readable media of claim 8, wherein the operations further comprise:
    recording an action of an individual transporting the physical money; and
    initiating transmission of a record of the action over the network.

14. The computer-readable media of claim 8, wherein the operations further comprise initiating control of the drive system to follow the physical money in response to a determination that the physical money moved beyond a perimeter of the first area.

15. A method comprising:
    determining that an individual is carrying physical money based on first data from a sensing system;
    tracking a location of the individual carrying the physical money as the individual moves from a first area in a building to a second area in the building based on second data from the sensing system, wherein the first area and the second area are separated from each other;
    locating obstacles along a route from a first area of a building to the second area of the building;
    obtaining an image of the individual carrying the physical money, the image configured to facilitate identification of the individual carrying the physical money;
    controlling a drive system of a robotic device based on the first data and the second data such that the robotic device follows the individual carrying the physical money from the first area to the second area while avoiding the obstacles and maintaining less than a predetermined distance between the robotic device and the individual;

identifying a planned destination for the physical money; and transmitting a confirmation message over a network in response to successfully following the individual carrying the physical money to the second area and a determination that the second area matches the planned destination, the confirmation message indicating successful transfer of the physical money to the planned destination.

16. The method of claim 15, wherein, transmitting the confirmation message over the network comprises causing the confirmation message to be communicated from the robotic device to a financial institution computing system.

17. The method of claim 15, wherein tracking the location of the individual comprises collecting data with a sensing system comprising one or more of a radio-frequency transceiver, a Bluetooth transceiver, a laser-based data transceiver, a photographic camera, a video camera, an infrared camera, or a LIDAR device.

18. The method of claim 17, wherein the sensing system is included onboard the robotic device.

19. The method of claim 15, wherein controlling the drive system comprises controlling operation of a propeller.

20. The method of claim 15, wherein controlling the drive system comprises controlling operation of one or more of a wheel, a track, a tread, or a leg.

* * * * *